United States Patent [19]

Schurman

[11] 4,151,976
[45] May 1, 1979

[54] MODULAR DIE SET FOR BLOW MOLDING CONTAINERS

[75] Inventor: Peter T. Schurman, Woodbridge, Conn.

[73] Assignee: The Plastic Forming Company, Inc., Woodbridge, Conn.

[21] Appl. No.: 849,314

[22] Filed: Nov. 7, 1977

[51] Int. Cl.² ........................................ B29O 23/03
[52] U.S. Cl. .............................. 249/102; 249/155; 425/522
[58] Field of Search .............. 249/102, 155; 425/522, 425/525, 532

[56] References Cited

U.S. PATENT DOCUMENTS

| | | | |
|---|---|---|---|
| 3,536,435 | 10/1970 | Schurman et al. | 206/545 |
| 3,659,999 | 5/1972 | Schurman | 425/525 |
| 3,807,928 | 4/1974 | Horberg, Jr. et al. | 425/526 |
| 3,914,101 | 10/1975 | Stefanka | 425/522 |

Primary Examiner—Roy Lake
Assistant Examiner—John McQuade
Attorney, Agent, or Firm—St. Onge, Steward, Johnston, Reens & Noe

[57] ABSTRACT

A modular die system is disclosed for use in blow molding an extruded plastic parison to form container members of essentially similar design but differeing dimensionally. Through use of composite die sets having modular elements, containers of different capacities can be molded without requiring complete die sets for each individual container size. That is, die elements used in molding a container member of one size may also serve in molding container members of a different size. This capability is achieved through break-down of the usual integral, cavity-defining die halves of a split die set into a plurality of die elements so selected that each of them controls but two of the three dimensions of the die cavity. Provision is made for substituting different die elements in the composite die sets and for securing these together on the platens of a blow molding press. The system simplifies tooling inventory and cost, especially in the manufacture of larger containers having a base or tray and hinged cover or lid, where the tray and lid are of congruent form but differ in their "hardware" configurations to provide non-identical but complementary hinge and latch formations, handle provisions, and the like.

9 Claims, 18 Drawing Figures

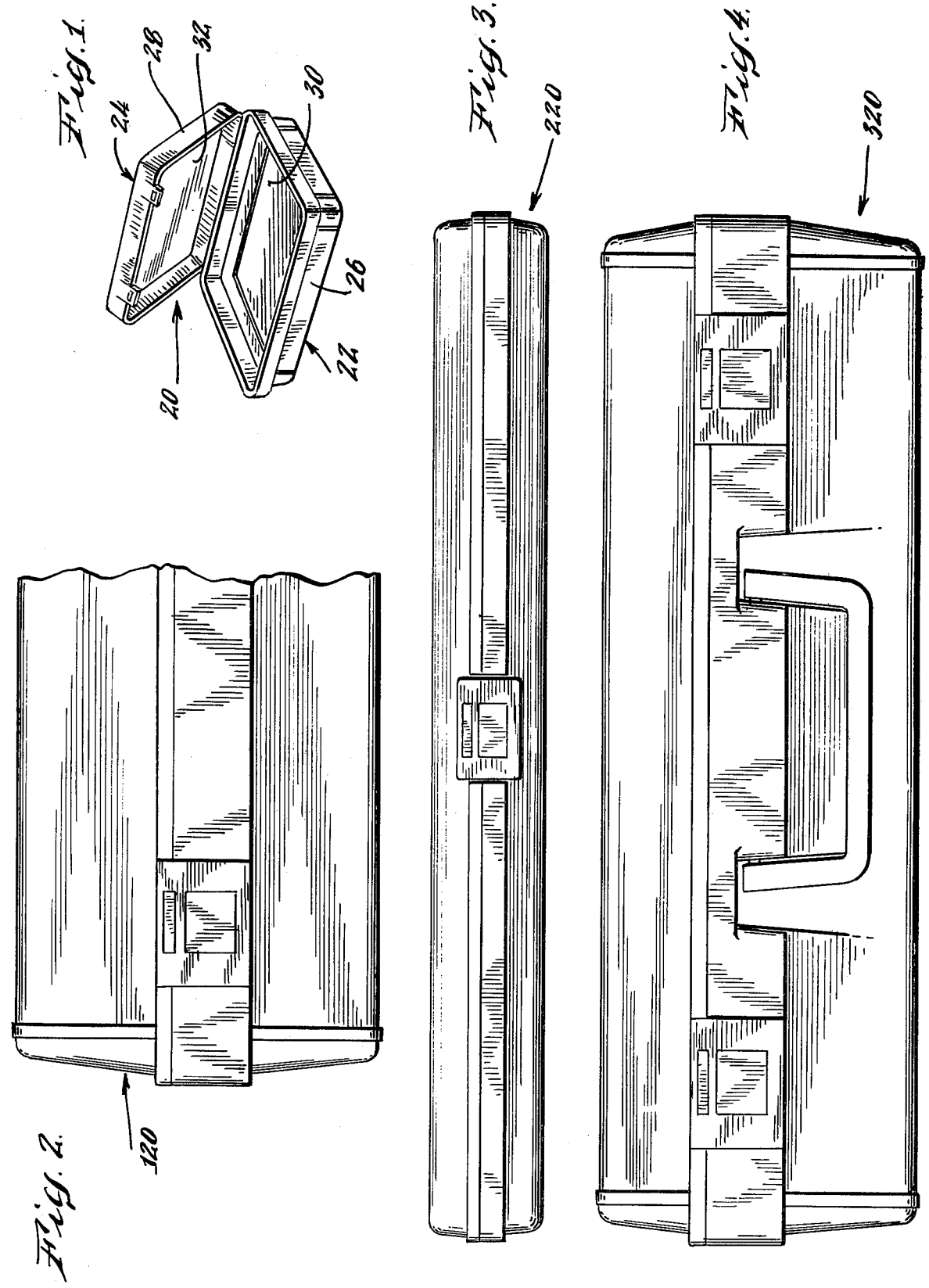

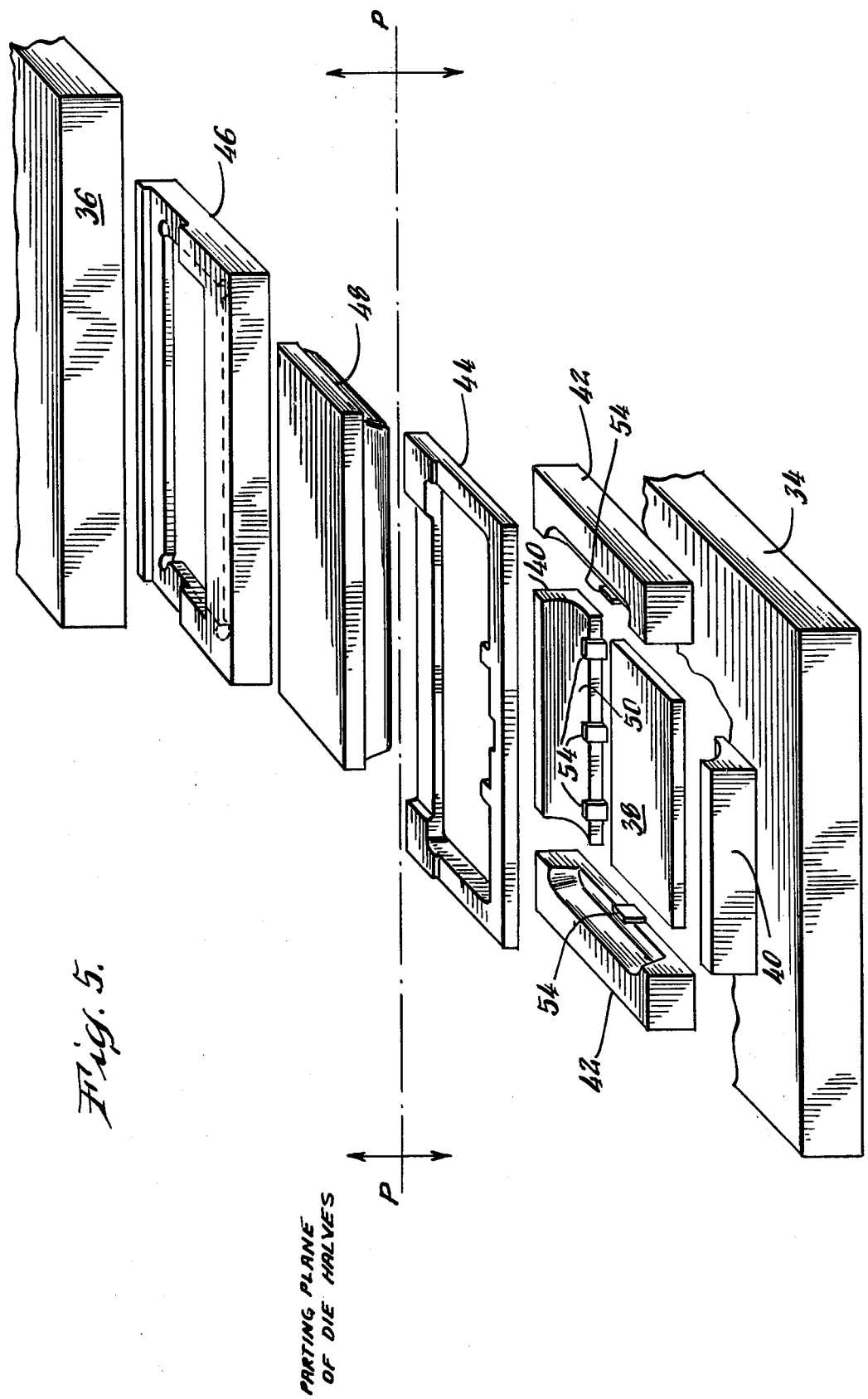

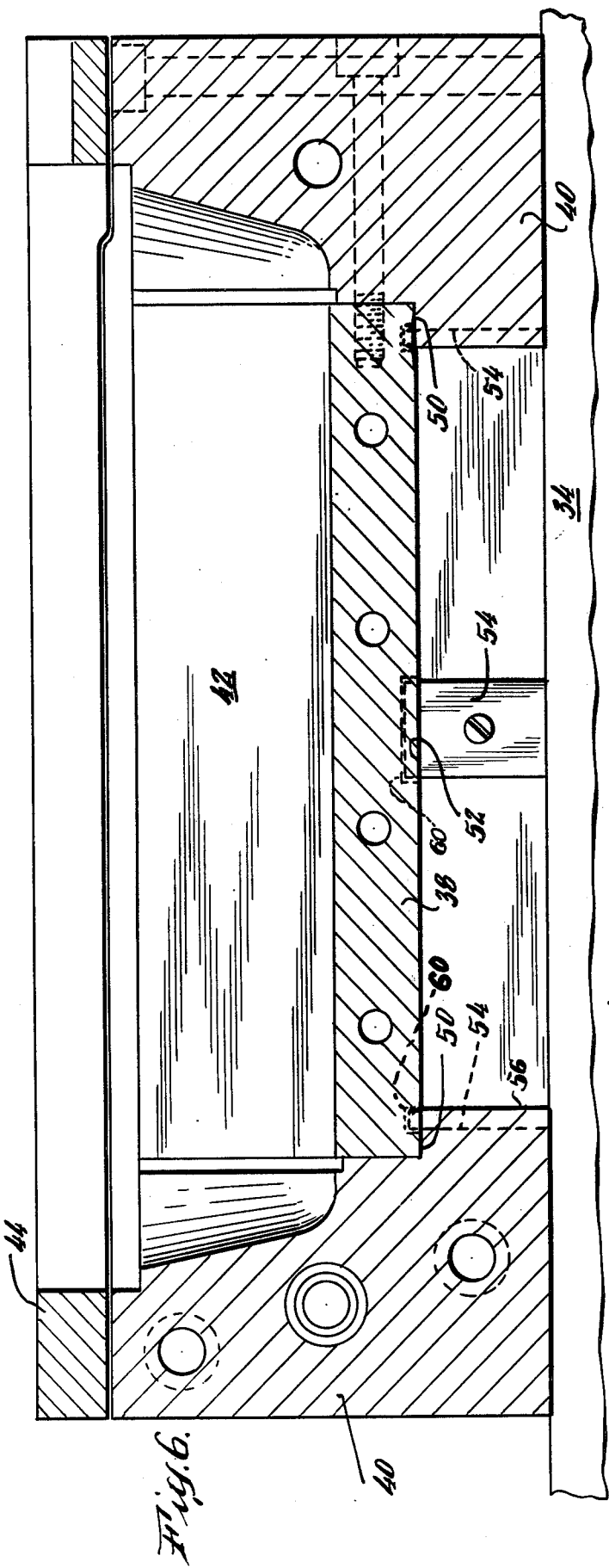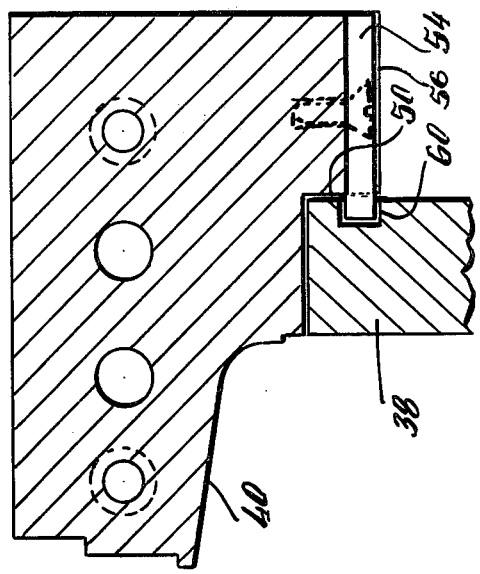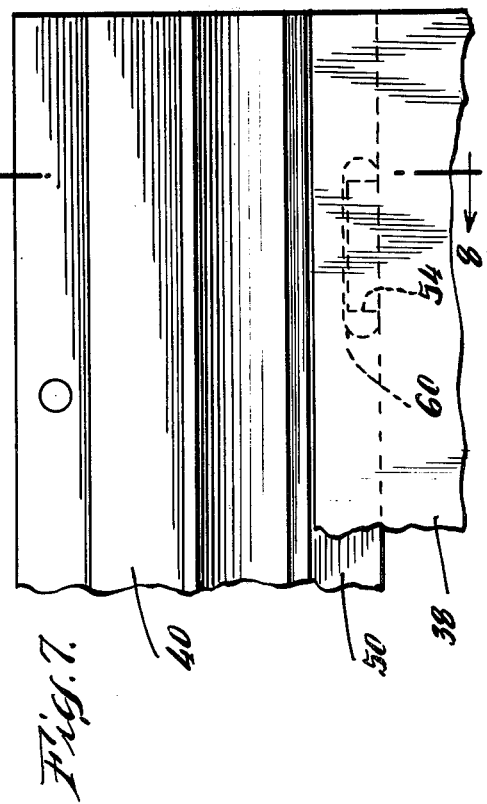

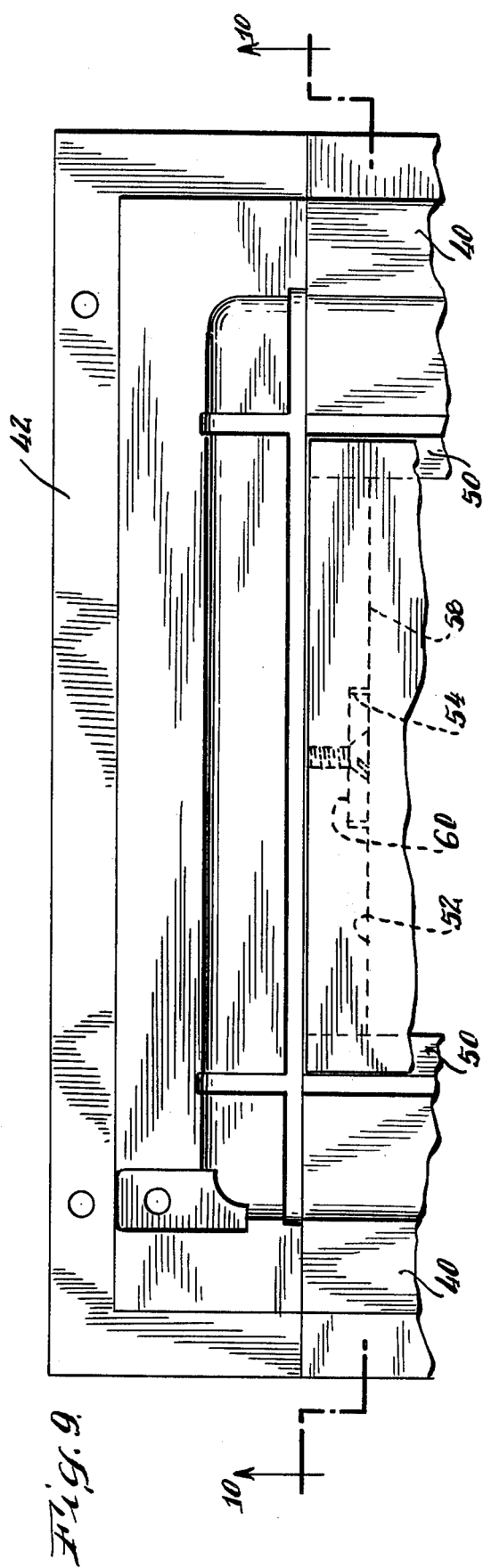
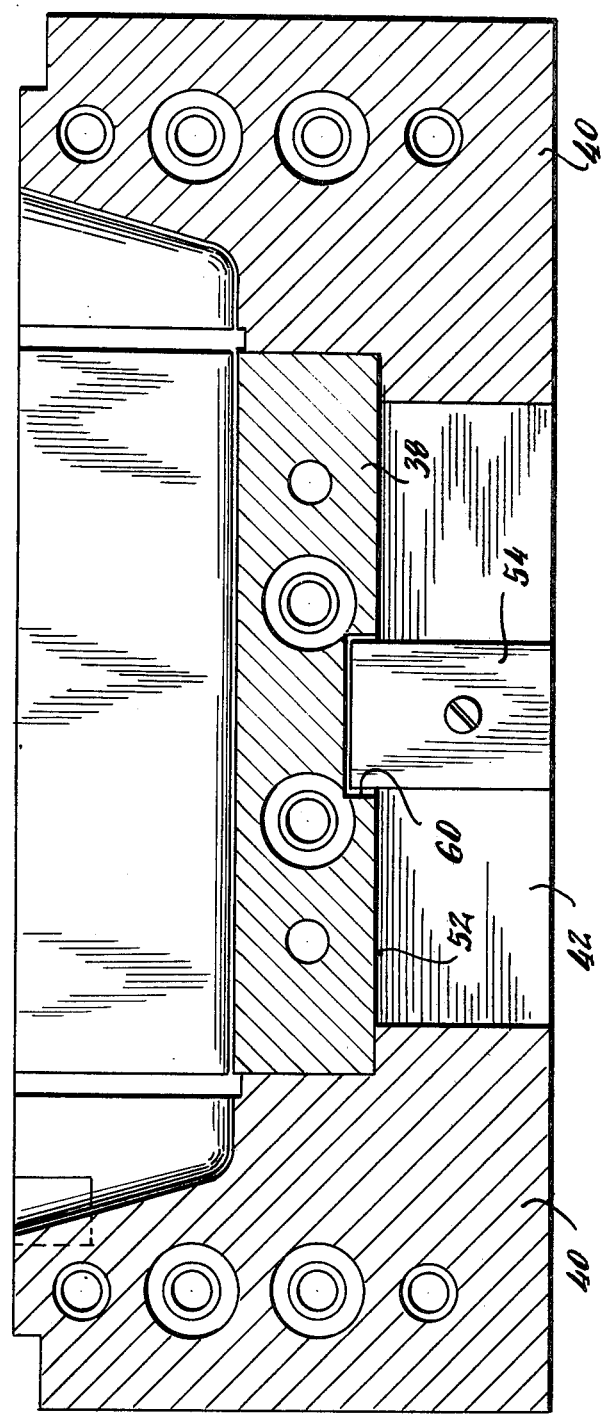

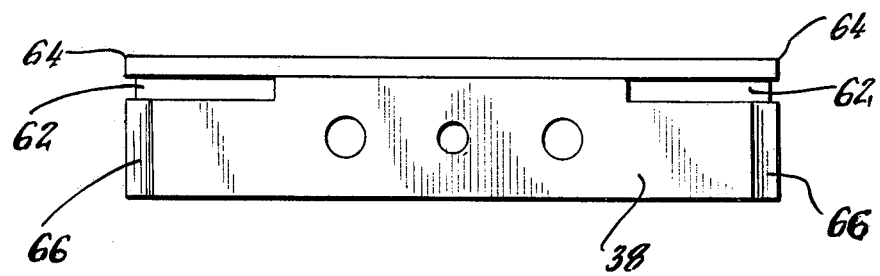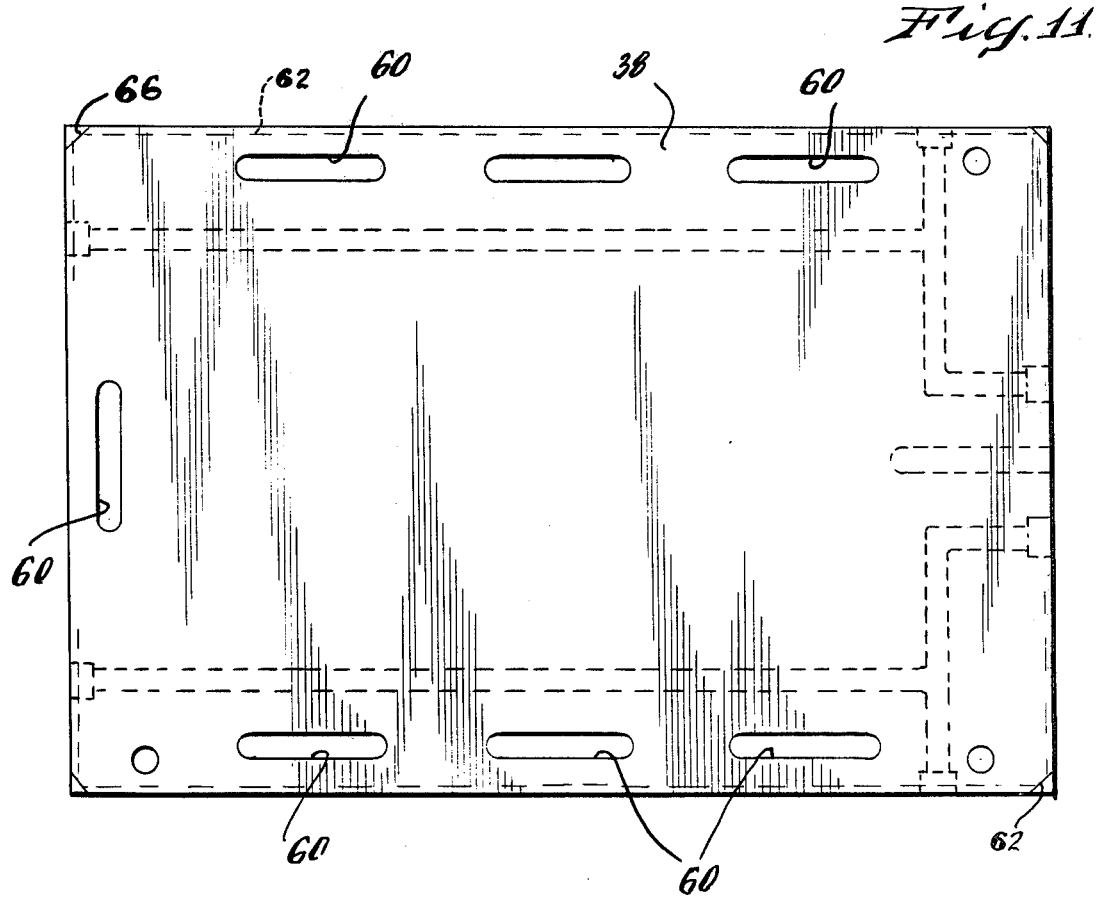

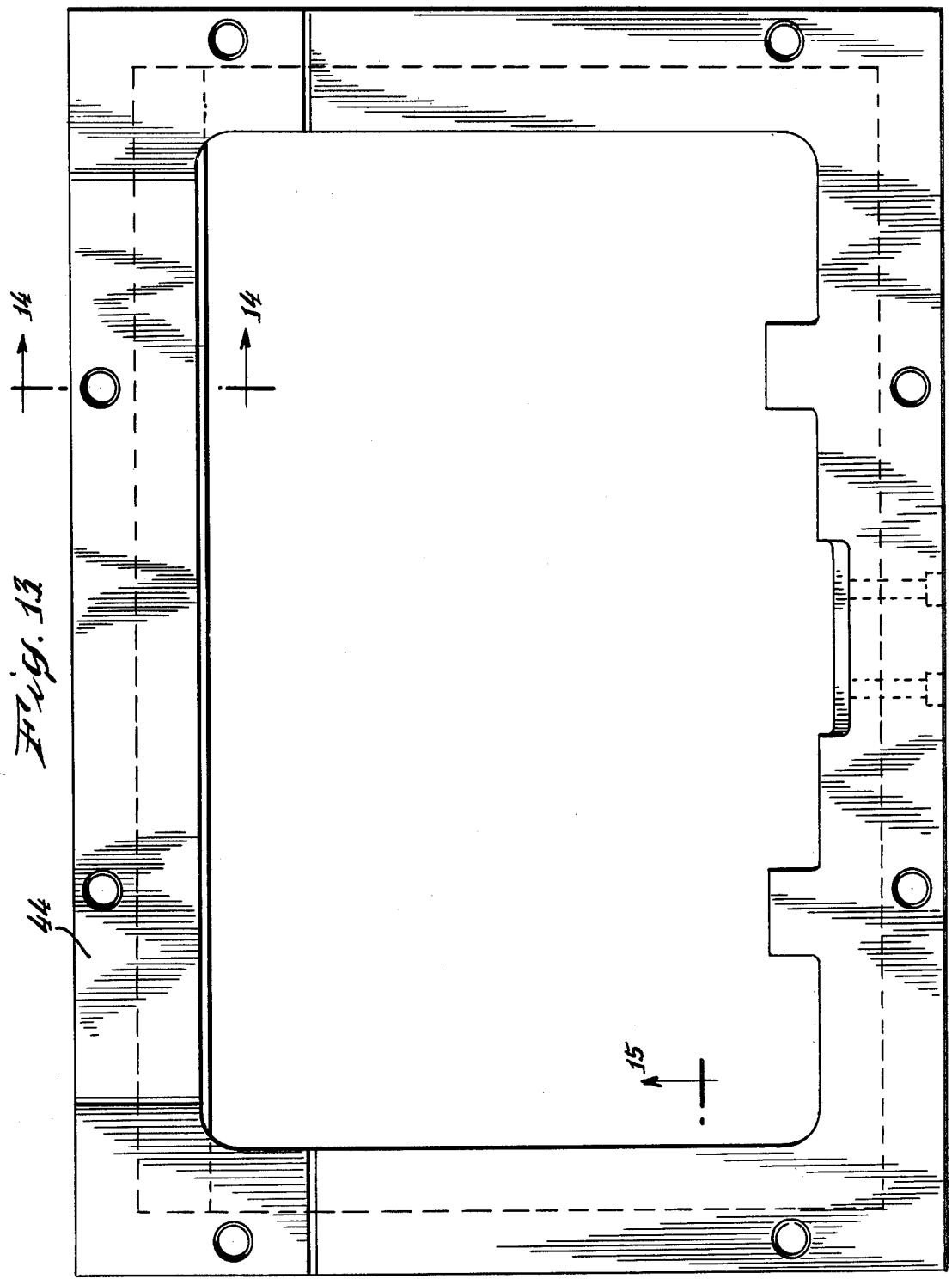
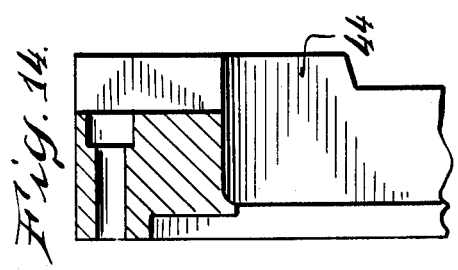
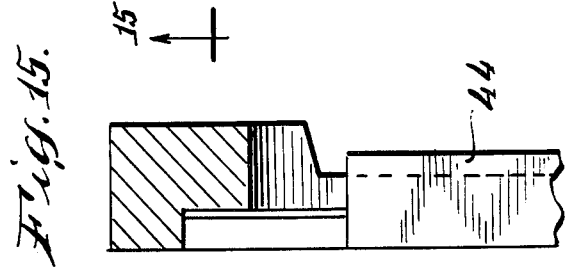

MODULAR DIE SET FOR BLOW MOLDING CONTAINERS

BACKGROUND OF THE INVENTION

1. Field of the Invention

This invention relates to dies for blow molding thermoplastic containers, and particularly a die system comprising sets of separate die elements of modular construction which can be assembled in different combinations to provide mold cavities of correspondingly different configurations and sizes. The system provides a means of using some of the same die elements for several different molding configuration and size requirements, whereby to enable the molder to customize containers to the particular requirements of different customers at substantial savings in tooling inventory and expense.

2. Description of the Prior Art

Blow molding of thermoplastic resin containers is conventionally accomplished by extruding a parison or sleeve of the thermoplastic resin from a ring die to cause the parison to hang in the parting plane of a split die. Complementary die members or die halves are suitably mounted on movable carriers positioned below the extrusion die and are moved between a closed position, in which the die halves are in abutment along the parting plane, and an open position in which the die halves are spaced apart so as to straddle the depending parison. Generally the entire die assembly is arranged to be translated bodily from a position directly below the extrusion die to a position laterally displaced therefrom. The arrangement facilitates automated production in that when a sufficient length of parison has been extruded between the parted die halves and these have been closed, the closed die with the parison clamped therein is moved laterally past a severing tool which cuts the clamped length of parison within the die from the continuously extruding portion. This allows unimpeded continuous extrusion of the parison while molding of the severed length in the die is being completed. The process is repeated after ejecting the finished part upon opening the die halves and shifting them back to straddle the depending parison. During the molding step, fluid pressure is introduced interiorily of the clamped portion of the parison in the mold to cause the parison walls to assume the full configuration of the mold cavity.

Examples of prior blow molding systems of the type discussed above appear in U.S. Pat. Nos. 3,317,955, 3,452,125, 3,536,435, 3,659,999, 3,796,780, 3,828,969, and 3,886,645.

Extensive use of the process has been made to blow molding of smaller containers or carrying cases of both single and double wall type, as in cases for protecting and transporting small hand tools and the like. Because of tooling costs in making the necessary dies, particularly where containers of larger sizes are involved, e.g. over 100 square inches of box area, it is frequently impractical for a molder to make it economically feasible to meet a customer's order for a relatively small number of containers. In the standard method of making dies for blow molding operations, the die maker in many cases starts with large solid blocks of metal, typically of aluminum alloys, and "hogs out" or machines away large portions of the metal from the block to produce the mold cavity of a typical die half for a split mold. In other cases, the molds are cast and this requires preliminary preparation of patterns and porosity-free cast surfaces, resulting in an expensive piece of metal. Attempts by molders to provide tooling for standard or stock sizes of containers, particularly in the case of larger sizes, is difficult because of the multitude of sizes possible, and the large changes and cost increments between sizes. Therefore, unless a customer's order is sufficiently large to justify amortization of tooling design for a specific container, the molder is unable to offer the customer containers that more closely match his particular size requirements.

Some attempt has been made to provide molds having capability for substituting die parts or portions to give some flexibility of product configuration without requiring complete, separate, die sets for each different configuration. U.S. Pat. No. 3,807,928 describes blow molding apparatus having a two-part die for molding plastic bottles, wherein the die is divided into a neck portion and a body portion so that different "finish" or neck configurations can be provided on the same or different body portions. That system, however, does not offer a solution to the problem of requiring completely separate die sets for each different body size. The body-defining portion of the set generally constitutes the major part of the die; furthermore machining or casting of the die half defining the body cavity is the major factor in tooling expense and time of preparation. The prior art has therefore not provided an answer to those problems to which this invention is more particularly directed.

SUMMARY OF THE INVENTION

It is a principal object of this invention to make it economically feasible for a molder of blow molded plastic cases, particularly those of substantial size, to customize those cases to the particular needs of different customers, even though the quantity of cases ordered by any individual customer would not justify tooling costs for the selected size and shape using the blow molding production methods and equipment heretofore available.

The improvement afforded by this invention is achieved through use of a modular tooling arrangement wherein the die sets comprise a composite of individual die elements for defining the molding cavity. Whereas the die halves have been of substantially integral formation heretofore, it is the teaching of this invention to break the die halves down into a composite of die elements which, when assembled, provides the desired mold cavity. Moreover, the underlying concept here taught is that of so selecting the elements into which a die half is broken down that each resulting element determines but two of the three controlling dimensions (length, width and depth) of the mold cavity in the assembled mold. Another feature of the concept involves breakdown of the heretofore integral mold part into separate elements in such manner that the same elements can be adapted to form the mold cavity for both the base and lid members of a hinged container through substitution of a different valance element in the total combination of elements. That is, through use of different valance elements in an otherwise unchanged combination of elements, it becomes simple to take care of the necessary differences in "hardware configuration" between the base and lid members of the container. That is, the differences between the two container members due to hinging elements, latch members and the provision of handle means, can be taken care of simply by substituting a different valance element in an otherwise identical composite of die elements.

Although the invention is applicable to the molding of single wall cases, in which instance no internal coring die is required, the invention is more particularly adapted to the production of large double-walled containers comprising separate base and cover parts, each of which is formed with an outer shell integrally connected to an inner liner spaced from the outer shell except along their juncture line. In molding such cases, a die set will include as one of the die halves a die part which may be referred to as a core, which defines the shape of the inner wall or liner of the container member. Since each customer's requirements for special formations in the inner wall of the container will vary from those of other customers, since the products to be containerized will normally be differently sized and shaped, not much can be done to provide a means of modularizing the core portion of the die set in accordance with the invention other than to divide this into a core frame and core body. The frame, since it defines the peripheral portion of the inner wall, can be used with different core bodies, and to this extent provides some economy. The modular arrangement, however, has substantially greater application to the complementary die half. For example, a die assembly embodying the modular design of composite elements in accordance with the invention will comprise, in the case of a die half defining the major body cavity portion of the mold, a cavity base plate, a pair of side rails, a pair of end caps and a valance portion. The side rails and end caps are complementary lengthwise, when attached to the periphery of the base plate, to define a continuous annular wall around that plate. The valance portion is preferably of annular peripherally integral construction (although it also could be broken up into modular elements, especially if very large), of a size to coincide with the annular wall when placed thereon. Such assembly, in combination with a suitable core frame and body, as mentioned above, serves to mold a first part, either top or bottom, of a container of given dimensions. The same assembly can be used for molding the complementary part of the container (again, either top or bottom) simply by substituting a different valance element and, if needed, core body in the die assembly. In other words, the finished molded product consists of two parts, i.e., tray and lid, which are symmetrical except for the difference produced by substituting the different valance and core body elements when molding the two parts. Thus the valance used in forming the tray part of the case may typically form a belt which runs around the container adjacent the parting plane of the tray and lid members, and this belt incorporates the necessary different formations for accommodating handle mounting, latch and hinge configurations.

Provision of a second set of side rails and end caps of the same length but different height than the first set, plus a new core body, enables the molder to use the same base plate and valance elements to form another size of case, this being of the same tray and lid area as the first but of different depth. Similarly, by substituting a different base plate and valance having one dimension (either length or width) the same as in the first assembly, but having the other dimension different from that first assembly, it becomes possible to use one pair of side rails or end caps from the first assembly in the new assembly, thus again introducing savings in the tooling costs for a box of still another dimension.

It will be apparent that with one set of die elements consisting of a base plate, two end caps and two side rails both of depth $D_1$, together with a valance of depth $V_1$, a hinged cover container or case can be molded having a depth equal to $2D_1+V_1$. If a second set of caps and rails of depth $D_2$ is provided, the molding combinations now possible are three different sizes wherein the containers are of similar cross sectional area but differ in depth. In this case the depths will be $2D_1+V_1$, $D_1+V_1+D_2$, and $2D_2+V_1$. If a third set of end caps and rails of still another depth is provided, the number of possible container configurations now becomes six, while a fourth set increases the possible combinations to 10 different depth configurations.

The same progression of different sizes, namely 1, 3, 6, 10, . . . applies in any of the situations where one die element dimension (width W or length L) is changed, and corresponding change is made in the cooperating base plate and valance frame of the die assembly. Of particular interest is the fact that once die assemblies are available for cases of area $L_1W_2$ and $L_2W_1$, a new case size $L_2W_2$ becomes available merely by providing an appropriate base plate and valance frame, and a matching core assembly. When three sets of assemblies are available (corresponding to $L_1$, $L_2$, $L_3$ and $W_1$, $W_2$, $W_3$), nine different configurations of cases then become available. With additional sets, the progression becomes 1, 4, 9, 16, 25, 36 . . . Adding the further variable of depth change discussed above, the number of combinations and permutations possible becomes greatly expanded. This gives a molder an opportunity to build up an inventory of die elements providing capability for quickly assembling dies to produce cases of dimensions more nearly meeting the optimum size requirements of different customers, rather than forcing them to compromise by selecting from a limited number of case dimensions, or to underwrite the full tooling costs of custom made dies for the particular dimension desired.

Other advantages arising from the modular die system here disclosed include reducing obsolescence risk because die element originally designed for one case size may still be useful with die assemblies for another. Furthermore, tooling time is substantially reduced because the molder does not have to wait for delivery of large castings or metal blocks, nor is he confronted with the time-consuming and expensive operation of making those castings or blocks to produce molds of the type heretofore used. The machining operations which the molder may still be required to perform in using the invention can be speeded up because, by breaking down the dies into separate elements, it now becomes possible for several machinists to work at the same time on such separate die elements. Formerly only one machinist could work on a given die.

As will be further apparent from the detailed description of a preferred embodiment described hereinafter, the modular die system of the invention provides for relatively easy assembly of the die elements to produce a desired molding configuration, yet the various parts are so designed that the assembled die is adequately strong to resist warping under the molding pressure involved. Other objects, aspects and advantages of the invention will be pointed out in or will be understood from the following detailed description provided below in reference to the accompanying drawings.

BRIEF DESCRIPTION OF THE DRAWINGS

FIG. 1 is a perspective view of a typical double walled blow molded case comprising a lower tray section and an upper lid section hinged together, the lid being shown in partially open position;

FIGS. 2, 3 and 4 are elevational views of three cases of similar configurations but different size, and incorporating different hardware;

FIG. 5 is an exploded perspective view of a split mold comprised of modular die elements in accordance with the invention;

FIG. 6 is a cross sectional view of an assembled modular half-die set for molding the tray portion of a case, the section being taken on the plane passing through the face of one end cap;

FIG. 7 is a fragmentary plan view of an end rail and base plate in assembled relation;

FIG. 8 is a cross sectional view of the rail and plate taken on line 8—8 in FIG. 7;

FIG. 9 is a fragmentary plan view of an end cap, side rail and base plate assembled without a valance frame;

FIG. 10 is a sectional view on line 10—10 of FIG. 9;

FIG. 11 is a plan view of a base plate;

FIG. 12 is an end elevational view of the base plate in FIG. 11;

FIG. 13 is a top plan view of a valance frame;

FIGS. 14 and 15 are sectional views taken on lines 14—14 and 15—15, respectively in FIG. 13;

DETAILED DESCRIPTION OF PREFERRED EMBODIMENTS

Figure 18:
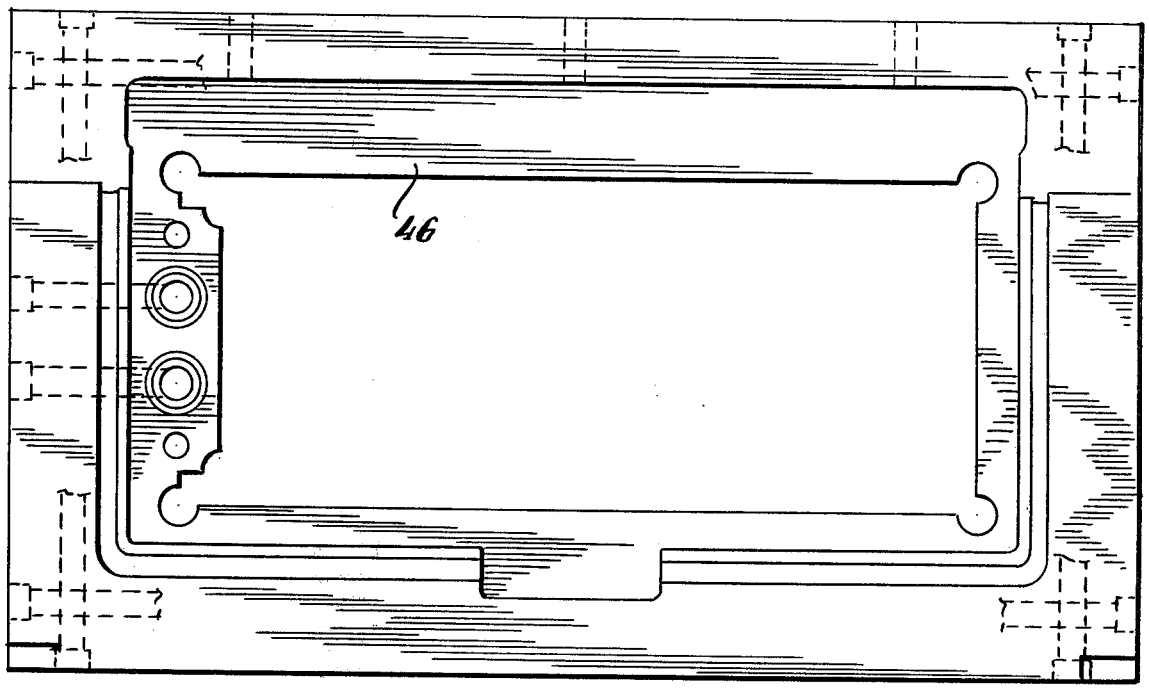
FIG. 18 is a plan view of a core frame for the core of FIG. 16.

As stated above, the invention is applicable to blow molding either single or double walled containers comprising a single open tray member. It is, however, more particularly adapted to making double-walled, two-part containers or boxes and the following description is directed to that embodiment.

FIG. 1 shows a typical container 20 of the latter type comprising a base or tray member 22 to which is hinged an upper or lid member 24. Each of these members is formed by molding a tubular parison of suitable extrudable thermoplastic polymer such as ABS, polyethylene or the like in known manner as disclosed in the prior patents mentioned hereinabove. The extruded parison is allowed to hang down from the extrusion nozzle between split die assemblies in a molding apparatus, and the dies are closed to clamp the parison between them. The portion of the parison within the dies is caused to assume the shape of the die cavities by injecting fluid, usually air, internally of the parison by means of an injection needle or blow pipe of known construction. In such manner, each of base and lid members 22, 24, is formed with an outer shell 26, 28, and an integral inner wall or liner 30, 32, respectively, spaced from its respective outer shell. The outer shell constitutes the main protective wall for enclosing the article or articles to be contained and may be configured to provide a decorative appearance. Inner liners 30, 32 of the respective members can be formed to provide pockets or sockets of special shape to accept articles to be contained and to hold them in oriented position when the container is closed.

In molding such a container it has been standard practice heretofore to employ a separate set of split dies, each die being a one-piece machined or cast member, for each different size of base or lid of the blow molded container. For large containers the die halves are correspondingly large, therefore. The present invention, instead of using a different set of one-piece die halves for each different container size, employs a system wherein each die half is built up of several interchangeable modular elements. These elements are arranged to be combined in different ways to permit changing the shape, size, hinging, latching, handle arrangement and other hardware configurations of the finished container. Thus several different container configurations can be produced using some of the same die elements. FIG. 5 illustrates the foregoing.

Die platens 34, 36, of conventional type in existing blow molding presses (see U.S. Pat. No. 3,317,955), are moved into and out of mold closing relation by suitable power means, not shown. That is, the die platens are mutually moved toward and away from the parting plane represented by broken line P-P in FIG. 5, along which the plastic parison is positioned by the continuous extrusion. Die platens 34, 36, carry sets of die elements which are assembled on and attached to the confronting faces of platens. The elements on each platen form die halves which complement each other in the closed condition of the mold to define a cavity whose surfaces shape the exterior and interior walls of the container member being molded in the cavity. Thus platen 34 carries a die half composed of an assemblage of elements including a base plate 38, paired side rails 40, paired end caps 42 and a valance frame 44. Together this set defines the exterior shape of shells 26 or 28 of a base or lid member, respectively. The opposite platen 36, in turn, carries a core frame 46, and a core body 48, which together define the shape of liners 30, 32 constituting the inner walls of a base or lid, respectively.

It will be apparent from the arrangement just described that if the original valance frame 44 is configured to produce a peripheral lip formation characteristic of a lid member, then substituting a modified valance frame configured to provide the desired lip configuration of a container base member will be the only change required in the composite half-die set for molding the complementary base member of the desired container. That is, in a container of symmetrical lid and base members, these will differ from each other only in the valance region where the two come together when closed. The difference is occasioned by the different requirements for fittings, such as hinge elements, latch member, handle provision or the like. Also of course, if the liners 30, 32 are not of identical form in the two container parts a change in core body 48 will likewise be required. However most of the die set serves double duty and thus effects a significant saving in tooling costs.

Provision of a second set of side rails 40 and end caps 42 defining a wall height different from that of the first set gives a molder the option to use the same base plate and valance frames in producing trays and lids of a second depth but same box area. This will enable a molder to offer customers a choice of three container sizes or configurations, which are illustrated for example by containers 120, 220 and 320 in FIGS. 2-4. If a third set of side rails and end caps is constructed of still another height, a total of six container styles or configurations then becomes possible. Increasing the side rails and end caps sets to four produces a total of ten different container sizes or configurations.

The foregoing progression can be expanded in another way by providing base plates of different width but same length, or same width but different length. In this case a new valance frame and a correspondingly coordinated set of side rails or end caps of appropriate length to match the different base plate dimension will be needed. Also there will be needed the complementary core elements. A molder can thus accummulate different sets of elements to provide modular combinations wherein the principal size-determining elements control but two of the three dimensions (length, width and depth) of a finished container, thereby enabling multiple use of the major die elements.

Further details are shown in FIGS. 6-13 on how the modular elements of a die half are combined to build up the mold cavity. Referring to FIGS. 6-10, two side rails 40 are positioned parallel to each other and are connected by caps 42 at opposite ends. The rails and caps are bolted together at the corners, and are also bolted to the face of the molding press platen. Each of the rails is rabbeted to provide a shelf 50 so that between them they support base plate 38 along its side edges. Similarly end caps 42 are formed to provide shelves 52 to receive and support opposite ends of the base plate. Supplementing the bolts securing the rails and caps to each other at their points of junction, there are key means 54 fastened in mortises spaced along the respective inner faces 56, 58 of the rails and caps. Those key means project above the floor of the shelves 50, 52 adjacent the free edges of the latter, and base plate 38 is correspondingly mortised on its under surface to provide recesses 60 which receive the projecting portions of keys 54. This provides a positive interlock which resists separation of the modular elements due to possible warping under molding pressure. To allow venting of the mold to take place, base plate 38 is milled about its four edges to provide a peripheral channel 62. Communication of the channel to the mold interior is provided by milling off a few thousandths of an inch along inner edges 64, while communication between channel 62 and the exterior of the mold is effected by champfering the corners 66 of the plate. This is illustrated more fully in FIGS. 11 and 12.

The last element of the die half defining the cavity for outer shell 22 (or 24) consists of valence frame 44 which is of annular form as seen best in FIG. 13. This frame, which will differ in cross sectional shape and inner contour depending on whether it is a base-forming valance or a lid-forming valance, is bolted to the surfaces of the assembled rails and caps to complete the appropriate cavity formation. Details are illustrated in FIGS. 14 and 15 of typical cross sections of a base cavity valance for the containers shown in FIGS. 1-4.

Figure 16:
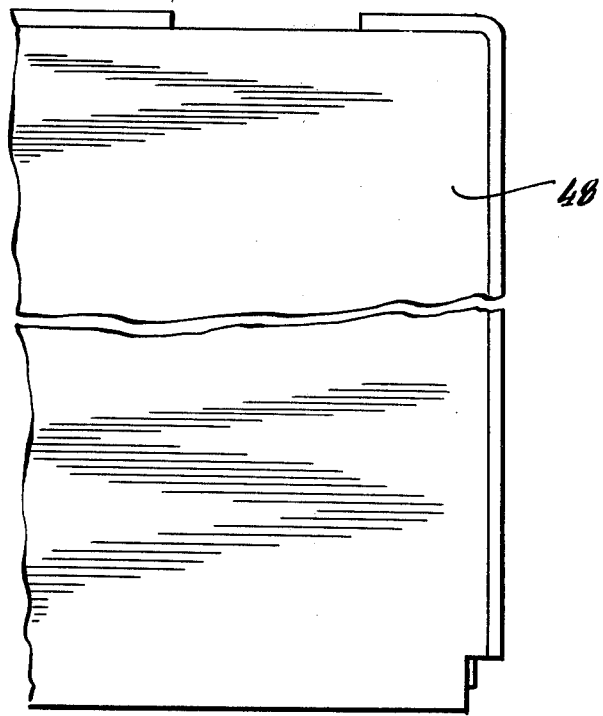
FIG. 16 is a fragmentary plan view of a core body for shaping the inner wall of a tray or lid of a case.
Figure 17:
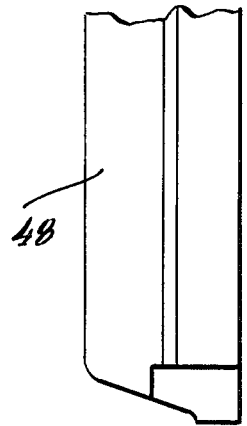
FIG. 17 is a partial detailed elevational view of the core body shown in FIG. 16.

The elements of the complementary die half carried by platen 36 comprise a core frame 46 and core body 48 as shown in FIG. 5 and as further illustrated in more detail in FIGS. 16-17. In general separate core bodies 48 are needed for molding a lid and a base. This is because of small differences in hardware configuration of the two; however only one core is illustrated, the other being essentially similar. Also the liners 30, 32 may include pockets or depressions used for nesting articles to retain them in an oriented position in the container.

Core body 48 is positioned within core frame 46 and both are secured to the face of platen 36, as by bolting to the platen. Different combinations of core frames and core bodies allow a molder to make different molded configurations in the edges or lips of the boxes. For the reasons already mentioned, a separate core is needed for each container of different dimension or interior wall configuration.

The die elements each require ducts for conducting cooling water throughout the mold, and since the elements are individually assembled to construct a mold cavity, arrangement is necessary for providing transfer of cooling medium from one element to the next at their interface in the assembly. The arrangement illustrated in the drawings comprises aligning the cooling ducts in the various elements and providing a recess and O-ring seal at each transfer point on the respective interfaces to prevent leakage. External connection of the assembled die to cooling water supply and return lines is accomplished in standard manner.

In practical application of the invention it has so far not been found necessary to modularize the core member of the partable die set, for reasons referred to above. However, this can be done if found advantageous from an economic standpoint, in which case the same principle will apply to so sectionalizing the core member into separate elements, that no element will control or determine more than two of the three dimensions of the core formation. Thus modular core assemblies can be provided to accommodate modular changes in the complementary die half. Furthermore, sectionalizing of the core will also facilitate changes in the shape and configuration (tool pockets, etc.) in the lid liner wall.

The foregoing illustrates a manner of implementing the concept of the invention in solving the problem of tooling costs and die inventory for blow molding different sizes of container members, particularly in the production of larger containers. Using the invention, it becomes more practical for a molder to retain ownership of the dies, rather than charging for and giving ownership of them to each customer which would prevent a molder from using the dies in producing similar products for other customers. From the customer's standpoint, the system offers advantages of a "custom" molded container at "stock" container costs.

What is claimed is:

1. A modular die set for use in blow molding an extruded plastic parison to form container members of similar design but different dimensions, wherein the molded member comprises a double walled container part having an outer shell and an integral liner spaced therefrom at points intermediate the junction of said shell and liner, said die set comprising
    two partable die halves adapted to form in closed relation the mold cavity in which said parison is received and molded by fluid pressure introduced through the parison wall;
    one of said die halves comprising a first set of separable elements which, in assembled relation, define the mold cavity configured to the desired shape of said outer shell;
    said die elements each being adapted and arranged to determine only two of the three dimensions of the mold cavity defined by the assembled elements.

2. A die set as defined in claim 1, wherein said die elements of said one die half comprise side rails, end caps, valance frame and base plate, and fastening means for securing said elements in assembled relation in which said rails and end caps form a peripheral wall surrounding said base plate and supporting it in spaced relation to said valance frame.

3. A die set as defined in claim 2, wherein said fastening means includes a rabbet along each of said rail and cap elements providing, in their assembled relation, a peripheral shelf in the wall of the mold cavity on which said base plate is supported; key means disposed in spaced relation around said mold cavity wall to project above said shelf at the free edge thereof; said base plate having on its under surface corresponding recesses about its periphery in which said key means are received.

4. A modular die set as defined in claim 1, which includes additional die elements corresponding to elements of said first set, wherein said additional elements when substituted for corresponding elements of said first set provide a mold cavity of different configuration than the cavity defined by the die elements of said first set.

5. A modular die set as defined in claim 4, wherein said additional die elements include a valance frame which, when substituted for the valance frame of said first set, provides a mold cavity defining a container member complementary to the container member produced in the mold cavity defined by the die elements of said first set, whereby the two container members form a base and lid for a closed container.

6. A modular die set as defined in claim 4, wherein said additional die elements comprise rails and caps of different height than the corresponding elements of the first set, which, when substituted for the rails and caps of said first set, provide a mold cavity defining a container member of different depth than the first.

7. A modular die set as defined in claim 4, wherein said additional set of die elements comprise rails or caps of different length than the corresponding rails or caps of the first set, which when substituted for the rails or caps of said first set provide a mold cavity defining a container member of different length or width than the first, said additional set also including in this instance a valance frame and a base plate each of which is dimensionally coordinated with the rail or cap lengths of said additional set.

8. A modular die set for use in blow molding a family of plastic containers of similar design but differing in size, wherein the finished containers comprise lid and tray members fitted together to form a closure, said die set comprising split mold parts defining a body cavity portion, a valance cavity portion and a core portion wherein at least said body cavity portion is composed of separate elements comprising at least one base plate and at least two sets of paired side rails and paired end caps, said rails and caps in each set being complementary lengthwise when attached to the periphery of a base plate to define a mold part having a body cavity, the rails and caps of one set being of different height or length than those of another set whereby to permit forming body cavities of different capacities with base plates having dimensions corresponding to the lengths of said rails and caps; said valance cavity portion defining a peripherally enclosed opening congruent with the opening of said body cavity portion when superimposed thereon, and means for securing said rails, caps, base plate and valance portion together to define a unitized rigid mold part cooperable with said core portion to complete said die set.

9. A modular die set adapted for blow molding an extruded plastic parison to form container parts of similar design but different dimensions, wherein the molded parts comprise a double-walled container member having an outer shell and an integral liner spaced therefrom at points intermediate the junction line of said shell and liner, said die set comprising partable die halves adapted to cooperate in forming the mold cavity between them in which said parison is received and molded by injection of fluid pressure introduced through the parison wall;

one of said die halves comprising a first set of separable die elements consisting of side rails, end caps, valance frame and base plate, and means for holding said elements in properly assembled first relation to define a mold cavity of given dimensions;

and other die elements which when substituted for corresponding elements in said first relation are coordinated to maintain two of the three dimensions of said mold cavity defined by the die elements of said first set, whereby to provide a second mold cavity of different dimension than the first while retaining at least some of the same die elements of the assembly defined by the die elements of said first set in forming said second mold cavity.

* * * * *